US012398345B2

(12) United States Patent
Amador Zamarreno et al.

(10) Patent No.: US 12,398,345 B2
(45) Date of Patent: Aug. 26, 2025

(54) METHOD OF LAUNDERING FABRIC

(71) Applicant: The Procter & Gamble Company, Cincinnati, OH (US)

(72) Inventors: Carlos Amador Zamarreno, Newcastle upon Tyne (GB); Anju Deepali Massey Brooker, Newcastle upon Tyne (GB); Laura Bueno Romo, Newcastle upon Tyne (GB); Andre Chieffi, Tynemouth (GB); Andrew Philip Moon, South Shields (GB)

(73) Assignee: The Procter & Gamble Company, Cincinnati, OH (US)

( * ) Notice: Subject to any disclaimer, the term of this patent is extended or adjusted under 35 U.S.C. 154(b) by 590 days.

(21) Appl. No.: 17/714,173

(22) Filed: Apr. 6, 2022

(65) Prior Publication Data

US 2022/0228091 A1 Jul. 21, 2022

Related U.S. Application Data

(63) Continuation of application No. PCT/US2020/070625, filed on Oct. 7, 2020.

(30) Foreign Application Priority Data

Oct. 8, 2019 (EP) .................................... 19202072
Oct. 22, 2019 (EP) .................................... 19204688

(51) Int. Cl.

| | |
|---|---|
| ***C11D 3/00*** | (2006.01) |
| ***C11D 3/386*** | (2006.01) |
| ***C11D 3/395*** | (2006.01) |
| ***C11D 3/40*** | (2006.01) |
| ***C11D 3/42*** | (2006.01) |
| ***C11D 3/50*** | (2006.01) |
| ***D06L 1/08*** | (2006.01) |

(52) U.S. Cl.

CPC ............ *C11D 3/0063* (2013.01); *C11D 3/001* (2013.01); *C11D 3/3951* (2013.01); *C11D 3/42* (2013.01); *C11D 3/505* (2013.01); *D06L 1/08* (2013.01); *C11D 2111/12* (2024.01); *C11D 2111/44* (2024.01)

(58) Field of Classification Search

None

See application file for complete search history.

(56) References Cited

U.S. PATENT DOCUMENTS

| | | | |
|---|---|---|---|
| 3,927,967 | A | 12/1975 | Speakman |
| 4,166,718 | A | 9/1979 | Holzle |
| 4,332,691 | A | 6/1982 | Beavan |
| 4,668,418 | A | 5/1987 | Ricchiero |
| 5,979,472 | A | 11/1999 | Lowery et al. |
| 6,339,055 | B1 | 1/2002 | Brooker et al. |
| 6,583,105 | B1 | 6/2003 | Hoehener et al. |
| 7,018,977 | B2 | 3/2006 | Martens |
| 7,604,012 | B2 | 10/2009 | Alpert et al. |
| 7,897,104 | B2 | 3/2011 | Kwon |
| 8,047,683 | B2 | 11/2011 | Olesen et al. |
| 8,461,095 | B2 | 6/2013 | Torres |
| 9,464,375 | B2 | 10/2016 | Willey et al. |
| 9,834,740 | B2 | 12/2017 | Willey et al. |
| 10,098,519 | B2 | 10/2018 | Willey et al. |
| 11,173,077 | B2 | 11/2021 | Erdem et al. |
| 11,285,056 | B2 | 3/2022 | Erdem et al. |
| 2002/0122743 | A1 | 9/2002 | Huang |
| 2004/0266648 | A1 | 12/2004 | Willey |
| 2005/0288200 | A1 | 12/2005 | Willey et al. |
| 2006/0079438 | A1 | 4/2006 | Brush |
| 2010/0200026 | A1 | 8/2010 | Boztas et al. |
| 2010/0216679 | A1 | 8/2010 | Batchelor et al. |
| 2010/0234259 | A1 | 9/2010 | Batchelor |
| 2011/0044848 | A1 | 2/2011 | Wright |
| 2011/0057123 | A1 | 3/2011 | Ho |
| 2014/0364353 | A1* | 12/2014 | Patterson ................. C11D 3/10 510/392 |

(Continued)

FOREIGN PATENT DOCUMENTS

| | | | |
|---|---|---|---|
| CN | 1061619 | A | 6/1992 |
| CN | 1409754 | A | 4/2003 |
| CN | 101501173 | A | 8/2009 |
| CN | 105087183 | A | 11/2015 |
| EP | 3444328 | A1 | 2/2019 |
| GB | 1372035 | A | 10/1974 |
| GB | 1372036 | A | 10/1974 |
| JP | S5792095 | A | 6/1982 |
| JP | 2011224208 | A | 11/2011 |
| WO | 01007549 | A1 | 2/2001 |
| WO | 02036722 | A1 | 5/2002 |
| WO | 2006002363 | A1 | 1/2006 |
| WO | 2007087259 | A2 | 8/2007 |
| WO | 2008065062 | A1 | 6/2008 |

(Continued)

OTHER PUBLICATIONS

All Office Actions; U.S. Appl. No. 17/714,172, filed on Apr. 6, 2022.
CM05146 PCT Search Report and Written Opinion for PCT/US2020/070625 dated Feb. 8, 2021, 08 pages.
CM5146F Extended European Search Report and Search Opinion; Application No. 19204688.6; dated Apr. 17, 2020; 06 pages.

*Primary Examiner* — Lorna M Douyon
(74) *Attorney, Agent, or Firm* — Andrew J. Mueller; George H. Leal

(57) ABSTRACT

A method of laundering fabric, where the method includes the steps of:

(a) in a main washing step, washing soiled fabric with an aqueous wash bath including detersive surfactant and one or more of the following components: perfume, brighteners, hueing dyes, enzymes, or any combination thereof; and (b) in a rinsing step, rinsing the soiled fabric with an aqueous rinsing solution including photo-bleach;

where an artificial light source is present and turned on during at least part of the rinsing step (b) and provides light to the aqueous rinsing solution in such a manner that activates the photo-bleach present in the aqueous rinsing solution, and where the artificial light source is turned off during at least part of the main washing step (a) and does not provide any light to the aqueous wash bath.

9 Claims, No Drawings

(56) References Cited

U.S. PATENT DOCUMENTS

| | | | | |
|---|---|---|---|---|
| 2015/0208898 | A1* | 7/2015 | Willey | B08B 3/10 422/186 |
| 2015/0209808 | A1 | 7/2015 | Watson | |
| 2015/0210964 | A1 | 7/2015 | Willey et al. | |
| 2018/0320109 | A1* | 11/2018 | Boutique | C11D 3/43 |
| 2019/0136440 | A1 | 5/2019 | Clarke | |
| 2021/0087738 | A1* | 3/2021 | Chieffi | C11D 3/24 |
| 2022/0228090 | A1 | 7/2022 | Amador Zamarreno et al. | |

FOREIGN PATENT DOCUMENTS

| | | | |
|---|---|---|---|
| WO | 2008128817 | A1 | 10/2008 |
| WO | 2009040175 | A1 | 4/2009 |
| WO | 2009148801 | A1 | 12/2009 |
| WO | 2010051808 | A2 | 5/2010 |
| WO | 2010099997 | A1 | 9/2010 |
| WO | 2013188331 | A1 | 12/2013 |
| WO | 2015112684 | A1 | 7/2015 |
| WO | 2016028599 | A1 | 2/2016 |

* cited by examiner

METHOD OF LAUNDERING FABRIC

FIELD OF THE INVENTION

The present disclosure relates to a method of laundering fabric with a photo-bleach and an artificial light source. The method is a laundering process that provides good cleaning performance, especially for soils that cause malodor.

BACKGROUND OF THE INVENTION

The benefits of using photoactive components within a laundry washing cycle have been described in prior art, for instance, improvement to stain removal or elimination of micro-organisms such as bacteria and spores.

Photobleach require a light source in order to be most effective during the laundering process. Including a light source in the laundering process, for example, but including a light source in the drum of an automatic washing machine, can be used to increase the performance of the photobleach. However, the inclusion of a light source in the laundering process causes the additional problem of the compatibility of the photobleach with other chemistries, such as perfume, brighteners, hueing dyes and enzymes.

There is a need to provide a laundering process that can activate a photobleach during the laundering process, but also overcome the problem of incompatibility of the activated photobleach with other chemistries, such as perfume, brighteners, hueing dyes and enzymes, e.g. so as to protect these detergent components from oxidative degradation by the light activated photocatalyst.

SUMMARY OF THE INVENTION

The present invention provides a method of laundering fabric, wherein the method comprises the steps of:

(a) in a main washing step, washing soiled fabric with an aqueous wash bath comprising detersive surfactant and one or more of the following components: perfume, brighteners, hueing dyes, enzymes, and any combination thereof; and (b) in a rinsing step, rinsing the soiled fabric with an aqueous rinsing solution comprising photo-bleach, wherein an artificial light source is present and turned on during at least part of the rinsing step (b) and provides light to the aqueous rinsing solution in such a manner that activates the photo-bleach present in the aqueous rinsing solution, and wherein the artificial light source is turned off during at least part of the main washing step (a) and does not provide any light to the aqueous main wash solution.

DETAILED DESCRIPTION OF THE INVENTION

The Method of Laundering Fabric

The method of laundering fabric comprises the steps of:

(a) in a main washing step, washing soiled fabric with an aqueous wash bath comprising detersive surfactant and one or more of the following components: perfume, brighteners, hueing dyes, enzymes, and any combination thereof and (b) in a rinsing step, rinsing the soiled fabric with an aqueous rinsing solution comprising photo-bleach, wherein an artificial light source is present and turned on during at least part of the rinsing step (b) and provides light to the aqueous rinsing solution in such a manner that activates the photo-bleach present in the aqueous rinsing solution, and wherein the artificial light source is turned off during at least part of the main washing step (a) and does not provide any light to the aqueous main wash solution.

Typically, the method is carried out in an automatic washing machine. Typically, the artificial light source is a light source present in the washing drum of the automatic washing machine.

The method can be used to provide whiteness and freshness benefits to a laundered fabric.

Step (a), Main Washing Step

In the main washing step, step (a), soiled fabric is washed with an aqueous wash bath comprising detersive surfactant and one or more of the following components: perfume, brighteners, hueing dyes, enzymes, and any combination thereof.

The artificial light source is present and turned off during at least part of the main washing step (a) and does not provide any light to the aqueous wash bath. Preferably, the artificial light source is turned off for the majority of the main washing step (a). It may even be preferred for the artificial light source to be turned off for the entire main washing step (a).

Step (b), Rinsing Step

In the rinsing step, step (b), the soiled fabric is rinsed with an aqueous rinsing solution comprising photobleach.

The artificial light source is turned on during at least part of the rinsing step (b) and provides light to the aqueous rinsing solution in such a manner that activates the photobleach present in the aqueous rinsing solution. Preferably, the artificial light source is turned on for the majority of the rinsing step (b). It may even be preferred for the artificial light source to be turned on for the entire rinsing step (b).

Photobleach

The photo-bleach typically comprises a photoactive moiety selected from the group consisting of xanthone, xanthene, thioxanthone, thioxanthene, phenothiazine, fluorescein, benzophenone, alloxazine, isoalloxazine, flavin, phthalocyanine, derivatives thereof, and any combination thereof.

Preferably the photobleach is selected from: riboflavin; phloxine B; erythrosine; salts of any of these photobleach; derivatives of any of these photobleach; and any combination thereof.

It may be preferred that:

(a) the photo-bleach is thioxanthone, and wherein the artificial light source provides light having a wavelength of from 300 nm to 400 nm;

(b) the photo-bleach is riboflavin, and wherein the artificial light source provides light having a wavelength of from 400 nm to 480 nm;

(c) the photo-bleach is phloxine B, and wherein the artificial light source provides light having a wavelength of from 460 nm to 570 nm;

(d) the photo-bleach is erythrosine, and wherein the artificial light source provides light having a wavelength of from 460 nm to 550 nm; and/or (e) the photo-bleach is phthalocyanine derivative, and wherein the artificial light source provides light having a wavelength of from 550 nm to 750 nm.

Aqueous Wash Bath

The aqueous wash bath is typically formed by contacting a laundry detergent to water. The laundry detergent typically comprises detersive surfactant and one or more of the following components: perfume, brighteners, hueing dyes, enzymes, and any combination thereof Rinsing Solution The rinsing solution comprises photobleach. The rinsing solution may comprise perfume, however, it may be preferred for the rinsing solution to not comprise any deliberately added perfume (perfume carried over into the rinsing solution from the main wash bath may be present). It may be preferred for the rinsing solution to not comprise chemistry that is incompatible with the photobleach, for example chemistry that may not be stable in the presence of photobleach. Such chemistry may include enzymes, hueing dye and/or brightener.

In addition, the rinsing solution may comprise chemistry that provides benefits to the fabric during the rinsing step. Such chemistry may include a fabric softener.

The rinsing solution is typically formed by contacting a fabric enhancer to water. The fabric enhancer typically comprises fabric softener. A suitable fabric softener includes cationic quaternary ammonium compounds, clay, silicone and any combination thereof.

Artificial Light Source

Typically, the artificial light source is present in the washing drum of the automatic washing machine. Preferably the artificial light source is provided by one or more LEDs, or two or more LEDs, or three or more LEDs, or even for four or more LEDs. Preferably the artificial light source is provided by one or more bulbs, or two or more bulbs, or three or more bulbs, or even for four or more bulbs.

Typically, the artificial light source is present and turned on during at least part of the rinsing step (b) and provides light to the aqueous rinsing solution in such a manner that activates the photo-bleach present in the aqueous rinsing solution. The artificial light is preferably turned on for the majority of the duration of the rinsing step (b), the artificial light may be turned on for the entirety of the rinsing step (b).

The artificial light source is turned off during at least part of the main washing step (a) and does not provide any light to the aqueous wash bath during this time. The artificial light source may be turned off for the majority of the duration of the main washing step (a), the artificial light source may be turned off for the entirety of the main washing step (a) and does not provide any light to the aqueous wash bath during this time.

By majority of time, it is meant for more than 50%, or even more than 60%, or even more than 70%, or even more than 80%, or even more than 90% of the time of the step.

The artificial light source may comprise two or more, or three or more, or even four or more, LEDs.

It may be preferred that the artificial light source emits diffused light.

A diffused light is defined as a light with a beam spread from 46° to 130° or higher, which corresponds to beam type from 4 to 7 according to the NEMA (National Electrical Manufacturers Association) beam spread classification (c.f. table 4).

TABLE 4

NEMA Beam Spread Classification
NEMA Beam Spread Classifications

| Beam Spread (°) | NEMA Type | Beam Description | Beam Projection Distance |
|---|---|---|---|
| 10° to 18° | 1 | Very Narrow | 240 ft and greater |
| 18° to 29° | 2 | Narrow | 200 to 400 ft |
| 29° to 46° | 3 | Medium Narrow | 175 to 200 ft |
| 46° to 70° | 4 | Medium | 145 to 175 ft |
| 70° to 100° | 5 | Medium Wide | 105 to 145 ft |

TABLE 4-continued

NEMA Beam Spread Classification
NEMA Beam Spread Classifications

| Beam Spread (°) | NEMA Type | Beam Description | Beam Projection Distance |
|---|---|---|---|
| 100° to 130° | 6 | Wide | 80 to 105 ft |
| 130° and up | 7 | Very Wide | under 80 ft. |

Laundry Detergent

The aqueous wash liquor used in the present invention may contain one or more detersive surfactants, typically including but not limited to: anionic surfactants, nonionic surfactants, cationic surfactants, zwitterionic surfactants, amphoteric surfactants, and combinations thereof.

Useful anionic surfactants for the practice of the present invention can themselves be of several different types. For example, water-soluble salts of the higher fatty acids, i.e., "soaps", are useful anionic surfactants in the aqueous wash liquor herein. This includes alkali metal soaps such as the sodium, potassium, ammonium, and alkyl ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap. Additional non-soap anionic surfactants which are suitable for use herein include the water-soluble salts, preferably the alkali metal, and ammonium salts, of organic sulfuric reaction products having in their molecular structure an alkyl group (included in the term "alkyl" is the alkyl portion of acyl groups) containing from about 10 to about 20 carbon atoms and a sulfonic acid or sulfuric acid ester group. Examples of this group of synthetic anionic surfactants include, but are not limited to: a) the sodium, potassium and ammonium alkyl sulfates with either linear or branched carbon chains, especially those obtained by sulfating the higher alcohols ($C_{10}$-$C_{20}$ carbon atoms), such as those produced by reducing the glycerides of tallow or coconut oil; b) the sodium, potassium and ammonium alkylethoxy sulfates with either linear or branched carbon chains, particularly those in which the alkyl group contains from about 10 to about 20, preferably from about 12 to about 18 carbon atoms, and wherein the ethoxylated chain has, in average, a degree of ethoxylation ranging from about 0.1 to about 5, preferably from about 0.3 to about 4, and more preferably from about 0.5 to about 3; c) the sodium and potassium alkyl benzene sulfonates in which the alkyl group contains from about 10 to about 20 carbon atoms in either a linear or a branched carbon chain configuration, preferably a linear carbon chain configuration; d) the sodium, potassium and ammonium alkyl sulphonates in which the alkyl group contains from about 10 to about 20 carbon atoms in either a linear or a branched configuration; e) the sodium, potassium and ammonium alkyl phosphates or phosphonates in which the alkyl group contains from about 10 to about 20 carbon atoms in either a linear or a branched configuration; and f) the sodium, potassium and ammonium alkyl carboxylates in which the alkyl group contains from about 10 to about 20 carbon atoms in either a linear or a branched configuration, and combinations thereof. Especially preferred for the practice of the present invention are surfactant systems containing C10-C20 linear alkyl benzene sulphonates (LAS) and C10-C20 linear or branched unalkoxylated alkyl sulfates (AS). Preferred for the practice of the present invention are LAS surfactants, as described hereinabove. The LAS can be present in either the pre-treatment composition or the subsequently added fabric treatment composition in an amount sufficient to form an aqueous wash liquor containing from about 100 ppm to about 2000 ppm, preferably from about 200 ppm to about 1500 ppm, more preferably from about 300 ppm to about 1000 ppm, of LAS.

The aqueous wash liquor may comprise (either as an alternative to LAS or in combination with LAS) one or more AS surfactants, as described hereinabove. The AS surfactant(s) can be present in the aqueous wash liquor at an amount ranging from about 100 ppm to about 2000 ppm, preferably from about 200 ppm to about 1500 ppm, more preferably from about 300 ppm to about 1000 ppm.

The aqueous wash liquor may further comprise one or more C10-C20 linear or branched alkylalkoxylated sulfates (AAS) having an average degree of ethoxylation ranging from about 0.1 to about 5, preferably from about 0.3 to about 4 and more preferably from about 0.5 to about 3. Such AES surfactants can be present therein at an amount ranging from about 0 ppm to about 1000 ppm, preferably from about 0 ppm to about 500 ppm, more preferably from about 0 ppm to about 300 ppm.

Further, the aqueous wash liquor may contain from about 0 ppm to about 1000 ppm, preferably from about 0 ppm to about 500 ppm, more preferably from about 0 ppm to about 200 ppm, of a nonionic surfactant. Preferred nonionic surfactants are those of the formula $R^1(OC_2H_4)_nOH$, wherein $R_1$ is a $C_{10}$-$C_{20}$ alkyl group or alkyl phenyl group, and n is from about 1 to about 80. Particularly preferred are $C_{10}$-$C_{20}$ alkylalkoxylated alcohols (AA) having an average degree of alkoxylation from 1 to 20.

Other surfactants useful herein include amphoteric surfactants and cationic surfactants. Such surfactants are well known for use in laundry detergents and are typically present at levels from about 10 ppm to about 300 ppm, preferably from about 15 ppm to about 200 ppm, more preferably from about 20 ppm to about 100 ppm.

The aqueous wash liquor comprises one or more of the following components: perfume, brighteners, hueing dyes, enzymes and any combination thereof. Suitable perfume includes perfume encapsulates. Suitable enzymes include protease, amylase, lipase, cellulase, mannanase, pectate lyase, DNAse, oxidase and any combination thereof.

The aqueous wash liquor of the invention may also contain one or more adjunct ingredients commonly used for formulating laundry detergent compositions, such as builders, fillers, carriers, structurants or thickeners, clay soil removal/anti-redeposition agents, polymeric soil release agents, polymeric dispersing agents, polymeric grease cleaning agents, enzyme stabilizing systems, amines, bleaching compounds, bleaching agents, bleach activators, bleach catalysts, dyes, dye transfer inhibiting agents, chelating agents, softeners or conditioners (such as cationic polymers or silicones), hygiene and malodor treatment agents, and the like. Preferably, the aqueous wash liquor of the present invention is substantially free of any fabric softening agent.

Aqueous Rinsing Solution

The aqueous rinsing solution comprises photobleach.

The rinsing solution of the present invention may consist essentially of water, either deionized water or tap water. The rinsing solution may comprise one or more fabric care agents selected from the group consisting of fabric softening agents, surface modifiers, anti-wrinkle agents, and the like. For example, the aqueous rinsing solution of the present invention may comprise a fabric softening agent at an amount ranging from about 10 ppm to about 2000 ppm, preferably from about 20 ppm to about 1500 ppm, more preferably from about 50 ppm to about 1000 ppm. Preferably, the fabric softening agent is a cationic compound, such as quaternary ammonium compounds, a cationic silicone, cationic starch, smectite clay, and combinations or derivatives thereof. More preferably, it is a diester quaternary ammonium compound of formula (I):

$$\{R4\text{-}m\text{-}N\text{+-}[(CH2)n\text{-}Y—R5]m\}A\text{-} \quad (I)$$

wherein each R is independently selected from the group consisting of hydrogen, a short chain C1-C6, poly(C2-C3 alkoxy), benzyl, and mixtures thereof m is 2 or 3; each n is independently from 1 to 4; each Y is independently —O—(O)C— or —C(O)—O—; the sum of carbons in each R5 is C11-C21, with each R5 independently being a hydrocarbyl or substituted hydrocarbyl group; and A- is a softener-compatible anion.

Preferably, in formula (I), each R is independently selected from a C1-C3 alkyl; m is 2; each n is independently from 1 to 2; each is independently —O—(O)C— or —C(O)—O—; the sum of carbons in each R5 is C12-C20, with each R5 independently being a hydrocarbyl or substituted hydrocarbyl group; and A- is selected from chloride, bromide, methylsulfate, ethylsulfate, sulfate, or nitrate. More preferably, the fabric softening agent is a bis-(2-hydroxyethyl)-dimethylammonium chloride fatty acid ester, preferably having an average chain length of the fatty acid moieties of from 16 to 20 carbon atoms, preferably from 16 to 18 carbon atoms. Alternatively, the fabric softening agent can be a cationic silicone, such as polydimethylsiloxane polymers comprising at least one quaternized nitrogen atom.

The aqueous rinsing solution herein may comprise other materials, non-limiting examples of which include surfactants, solvents, salts (e.g., CaCl2), acids (e.g., HCl and formic acid), preservatives, and water. Preferably, the aqueous rinse liquor of the present invention is substantially free of the anionic and nonionic surfactants described hereinabove for the aqueous wash liquor, and more preferably it is substantially free of any surfactants.

EXAMPLES

Example 1: Enzyme Stability with Light and Photocatalyst During Main Washing Process A cleaning composition containing the following ingredients (table 1) were placed in a jar with 50 ml of water and six 5 cm×5 cm knitted cotton swatches (Warwick Equest, Ltd.). The jar was placed inside a light box with and manually agitated every 2 minutes. After 40 min., an aliquot was taken and the enzymatic activity was measured Protease activity was analysed using Protease substrate N-Succinyl-ALA-ALA-PRO-PHE p-nitroanilide (PNA) and Amylase activity was analysed using the Infinity Amylase reagent assay.

For the reference, the same compositions were placed in a jar with 50 ml of water and six 5 cm×5 cm knitted cotton swatches (Warwick Equest, Ltd.) and jars were kept in the dark.

TABLE 1

| Group | Component | Composition A, ppm | Composition B ppm | Composition C ppm |
|---|---|---|---|---|
| Surfactants | Sodium dodecyl benzenesulfonate (LAS) | 357 | 357 | 357 |
| | C14-15 AA with 7 EO | 202 | 202 | 202 |
| | C12-14 AES with 3 EO (70%) | 220 | 220 | 220 |
| | Lauramine oxide | 19 | 19 | 19 |
| Builders/ | Fatty Acids | 121 | 121 | 121 |
| Chelant | Citric Acid | 156 | 156 | 156 |
| | Diethylene triamine penta (methyl phosphonic acid) (DTPMP) | 18 | 18 | 18 |
| Performance | Polymer Lutensit Z96 | 25 | 25 | 25 |
| actives/ preservatives | Polyethylene glycol (PEG) - co-polyvinyl acetate (PvAc) | 51 | 51 | 51 |
| | Brighteners | 4 | 4 | 4 |
| | Preservatives | 0.1 | 0.1 | 0.1 |
| Enzymes/ stabilisers | Protease | 600 ul from 40.5 g/l solution | 600 ul from 40.5 g/l solution | 600 ul from 40.5 g/l solution |
| | Amylase | 200 ul from 25.4 mg/g solution | 200 ul from 25.4 mg/g solution | 200 ul from 25.4 mg/g solution |
| | Na Formate (40% solution) | 52 | 52 | 52 |
| Solvent/ | Ethanol | 19 | 19 | 19 |
| neutralizer/ | 1,2 Propylene glycol | 190 | 190 | 190 |
| structurant | NaOH | 204 | 204 | 204 |
| | MEA hydrogenated castor oil | 15 | 15 | 15 |
| Photocatalyst | Thioxanthone | 0 | 10 | 0 |
| | Riboflavin | 0 | 0 | 10 |

TABLE 2

Enzyme Degradation in presence of Light and Photoactivator

| Product | % Enzyme Activity without Light (reference) | % Enzyme Activity with Light exposure |
|---|---|---|
| Table 2a: Amylase Activity was analysed using the Infinity Amylase reagent assay | | |
| Composition A | 100 | 82.3 |
| Composition B | 100 | 16.2 |
| Composition C | 100 | 1.2 |
| Table 2b: Protease Activity was analysed using Protease substrate N-Succinyl-ALA-ALA-PRO-PHE p-nitroanilide (PNA): | | |
| Composition A | 100 | 61.8 |
| Composition B | 100 | 1.6 |
| Composition C | 100 | 1.5 |

Table 2 a shows Amylase activity for the reference samples (not exposed to light) and the compositions exposed to light for 40 min. Table 2 b shows Protease activity for the reference samples (not exposed to light) and the compositions exposed to light for 40 min. This data indicates a considerable lower enzyme activity in presence on light, even more when the cleaning composition has a photocatalyst (compositions B and C).

Example 2: Malodour Decomposition with Light and Photocatalyst

A rinsing composition containing the following ingredients (table 3) were placed in a flask containing a septum (to facilitate headspace analysis) with 10 ml of water and 18 ppm of skatole (a malodour component). The jar was placed inside a light box for 15 min. and the headspace was sampled and analysed using GC-MS.

This involved incubating the samples at 30° C. prior to sampling the headspace with a PDMS-SPME fibre (Polydimethylsiloxane—Solid Phase Micro Extraction). The fibre was then desorbed in the hot inlet of the Agilent 7890B gas chromatograph. The skatole present in the headspace were separated on a DB-5 column and identified by Agilent 5977B mass-spectrometer with mass-spec.

The experiment was run in 2 conditions: water solution and 100 ppm LAS, mimicking the carry over of main wash surfactant into the rinse cycle.

TABLE 3

| | Composition | | | | | |
|---|---|---|---|---|---|---|
| | 4 | 5 | 6 | 7 | 8 | 9 |
| LAS | 0.0 | 0.0 | 0.0 | 100 ppm | 10 0 ppm | 100 ppm |
| Tioxanthone | 0.0 | 5.0 ppm | 0.0 | 0.0 | 5.0 ppm | 0.0 |
| Riboflavin | 0.0 | 0.0 | 5.0 ppm | 0.0 | 0.0 | 5.0 ppm |

TABLE 4

Malodour (skatole) in head space by GCMS

| | GCMS |
|---|---|
| Composition 4 (comparative) | 100% |
| Composition 5 (invention) | 27.7% |
| Composition 6 (invention) | 0.7% |
| Composition 7 (comparative) | 100% |
| Composition 8 (invention) | 39.3% |
| Composition 9 (invention) | 0.6% |

Table 4 shows the headspace level for malodor expressed as the percentage of headspace remaining after the treatment. It can be observed that in the comparative wash process (composition 4 and 7) there is nil malodor reduction after treatment. The invention compositions (compositions 5, 6, 8 and 9) have a significant removal of skateole (malodour).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A method of laundering fabric, wherein the method comprises the steps of:

(a) in a main washing step, washing soiled fabric with an aqueous wash bath comprising detersive surfactant enzymes and optionally one or more of the following components: perfume, brighteners, hueing dyes, or any combination thereof; and (b) in a rinsing step, rinsing the soiled fabric with an aqueous rinsing solution comprising photo-bleach;

wherein an artificial light source is present and turned on during the rinsing step (b) and provides light to the aqueous rinsing solution in such a manner that activates the photo-bleach present in the aqueous rinsing solution, and wherein the artificial light source is turned off during the main washing step (a) and does not provide any light to the aqueous wash bath.

2. A method according to claim 1, wherein the method is carried out in an automatic washing machine, and the artificial light source is a light bulb present in the washing drum of the automatic washing machine.

3. A method according to claim 1, wherein the photo-bleach is selected from the group consisting of: riboflavin; phloxine B; erythrosine; salts of any of these photo-bleaches; derivatives of any of these photo-bleaches; and any combination thereof.

4. A method according to claim 1, wherein:

(a) the photo-bleach is thioxanthone, and wherein the artificial light source provides light having a wavelength of from about 300 nm to about 400 nm;

(b) the photo-bleach is riboflavin, and wherein the artificial light source provides light having a wavelength of from about 400 nm to about 480 nm;

(c) the photo-bleach is phloxine B, and wherein the artificial light source provides light having a wavelength of from about 460 nm to about 570 nm;

(d) the photo-bleach is erythrosine, and wherein the artificial light source provides light having a wavelength of from about 460 nm to about 550 nm; and/or (e) the photo-bleach is phthalocyanine derivative, and wherein the artificial light source provides light having a wavelength of from about 550 nm to about 750 nm.

5. A method according to claim 1, wherein the aqueous wash bath comprises a hueing dye.

6. A method according to claim 1, wherein the aqueous wash bath comprises a brightener.

7. A method according to claim 1, wherein the aqueous rinsing solution further comprises a fabric softener.

8. A method according to claim 1, wherein the artificial light source comprises two or more bulbs.

9. A method according to claim 1, wherein the artificial light source emits diffused light.

* * * * *